G. S. KNAPP.
Mowing Machine.
No. 33,997.
Patented Dec. 24, 1861.
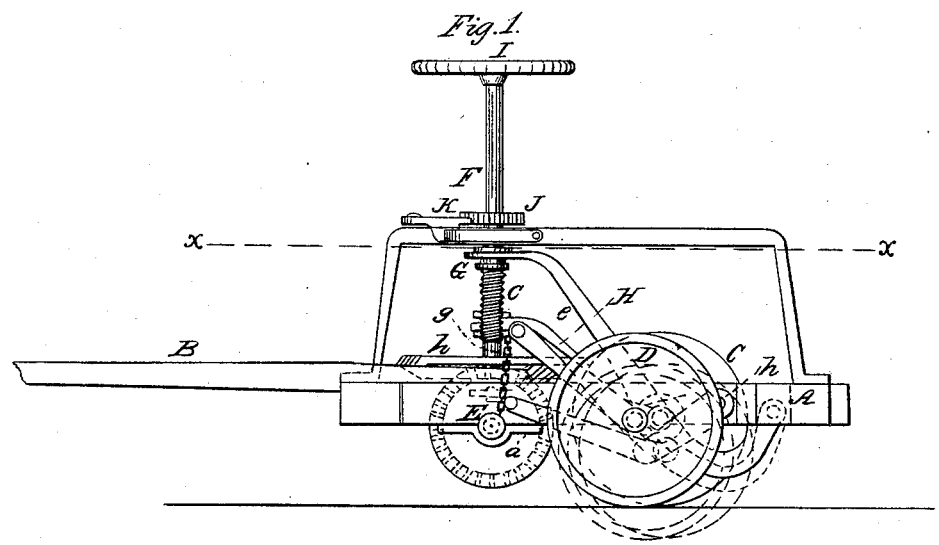
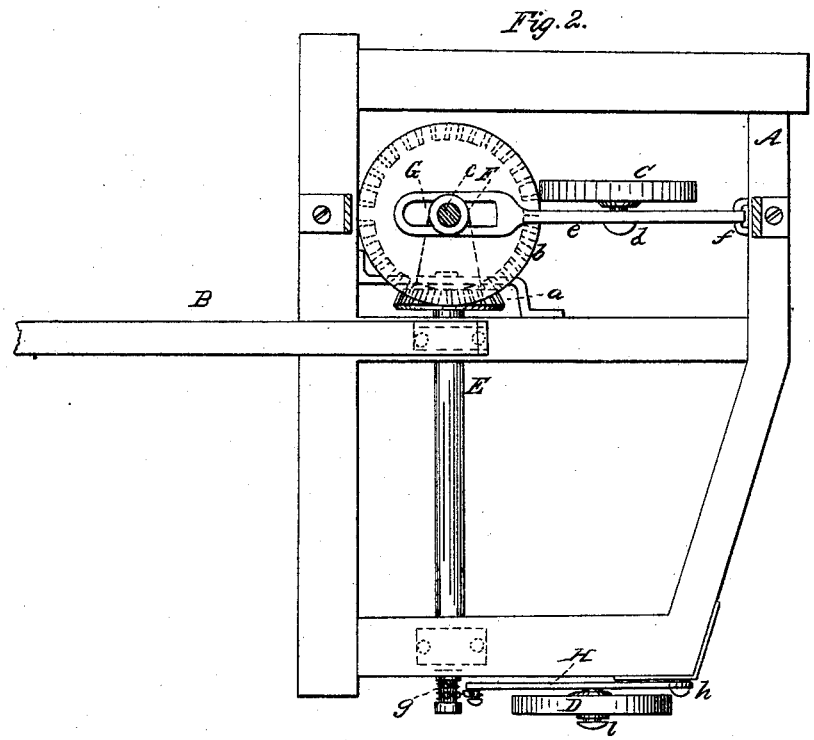
Witnesses:
Inventor:

UNITED STATES PATENT OFFICE.

GEO. S. KNAPP, OF DUBUQUE, IOWA.

IMPROVEMENT IN HARVESTERS.

Specification forming part of Letters Patent No. 33,997, dated December 24, 1861.

*To all whom it may concern:*

Be it known that I, GEORGE S. KNAPP, of Dubuque, in the county of Dubuque and State of Iowa, have invented a new and improved means for elevating the bodies of harvesters and other agricultural machines—such as seeding-machines, &c.—so that the same can readily pass over obstructions or obstacles which may lie in their path; and I do hereby declare that the following is a full, clear, and exact description of the same, reference being had to the annexed drawings, making a part of this specification, in which—

Figure 1 is a side view of my invention. Fig. 2 is a horizontal section of the same, taken in the line $x\ x$, Fig. 1.

Similar letters of reference indicate corresponding parts in the two figures.

This invention consists in having the body of the machine mounted on wheels, which are provided with adjustable axles, so arranged that the axles of both wheels may be elevated and depressed simultaneously and the body of the machine readily raised and lowered at the will of the driver or attendant, as hereinafter described.

To enable those skilled in the art to fully understand and construct my invention, I will proceed to describe it.

A represents the frame of a harvesting-machine, and B the draft-pole attached thereto. C D are the two wheels on which the frame A is mounted. In the frame A there is placed a horizontal shaft, E, which has a bevel-wheel, $a$, at one end, said wheel $a$ gearing into a corresponding wheel, $b$, at the lower end of a vertical shaft, F, which has a screw, $c$, on it, a nut, G, being fitted on the screw $c$.

The wheel C has its axle $d$ attached to an arm, $e$, the back end of which is connected by a joint, $f$, to the back part of frame A. The front end of arm $e$ is connected to the nut G on the screw $c$ of shaft F. The outer end of the shaft E has a chain, $g$, attached to it, and this chain is connected to the end of an arm, H, the back part of which is connected by a joint or pivot, $h$, to the back part of frame A. The wheel D has its axle $i$ attached to the arm H.

The upper end of the shaft F is provided with a hand-wheel, I, which is within convenient reach of the driver or attendant, and on the shaft F there is placed a ratchet, $j$, into which a pawl, $k$, catches and prevents the shaft from casually turning.

The operation will, from the above description, be readily understood. As the machine is drawn along the driver may at any time, when necessary, elevate the frame A by turning the shaft F in the proper direction, the screw $c$ and nut G of shaft F, and the chain $g$ of shaft E, which form the medium of connection between the arms $e$ H and frame A, effecting the result.

This arrangement, it will be seen, admits of the frame A being raised bodily, so as to pass over obstructions, and it is essential that the arms $e$ H be both acted upon simultaneously in order to effect the desired end.

The invention is applicable to grain and grass harvesters as well as to seeding-machines, and various other agricultural implements which require to be elevated in order to clear obstructions which may lie in their path.

Having thus described my invention, what I claim as new, and desire to secure by Letters Patent, is—

The attaching of the axles of the wheels C D of a harvester or other mounted agricultural machine to arms $e$ H, connected to the frame A or body of the machine, and to a shaft, F, substantially as and for the purpose set forth.

GEORGE S. KNAPP.

Witnesses:
L. D. RANDALL,
GEO. W. J. KARRICK.